US010538347B1

(12) United States Patent
Turner et al.

(10) Patent No.: US 10,538,347 B1
(45) Date of Patent: Jan. 21, 2020

(54) SMALLSAT PAYLOAD CONFIGURATION (71) Applicant: Space Systems/Loral, LLC, Palo Alto, CA (US)

(72) Inventors: Andrew E. Turner, Mountain View, CA (US); William G. Hart, III, La Crescenta, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 408 days.

(21) Appl. No.: 15/351,233

(22) Filed: Nov. 14, 2016

(51) Int. Cl.
*B64G 1/64* (2006.01)
*B64G 1/00* (2006.01)
*B64G 1/10* (2006.01)

(52) U.S. Cl.
CPC .............. *B64G 1/641* (2013.01); *B64G 1/007* (2013.01); *B64G 1/10* (2013.01); *B64G 2001/643* (2013.01)

(58) Field of Classification Search
CPC .. B64G 2001/643; B64G 1/641; B64G 1/007; B64G 1/10
USPC ..................................................... 244/158.5
See application file for complete search history.

(56) References Cited

U.S. PATENT DOCUMENTS

| 3,380,687 A | * | 4/1968 | Ford | B64G 1/641 |
| | | | | 102/393 |
| 4,667,908 A | * | 5/1987 | Hayden | B64G 1/14 |
| | | | | 244/172.5 |
| 4,964,596 A | * | 10/1990 | Ganssle | B64G 1/646 |
| | | | | 244/172.5 |
| 5,052,640 A | * | 10/1991 | Chang | B64G 1/002 |
| | | | | 136/292 |
| 5,145,130 A | * | 9/1992 | Purves | B25J 5/00 |
| | | | | 244/159.4 |
| 5,199,672 A | | 4/1993 | King et al. | |
| 5,605,308 A | * | 2/1997 | Quan | B64G 1/641 |
| | | | | 102/489 |
| 5,613,653 A | * | 3/1997 | Bombled | B64G 1/641 |
| | | | | 244/173.1 |
| 6,138,951 A | | 10/2000 | Burdis et al. | |

(Continued)

OTHER PUBLICATIONS

Toorian et al., "Cubesats as responsive satellites," AIA-RS3 2005-3001, 3rd Responsive Space Conference 2005, 9 pages.

*Primary Examiner* — Tien Q Dinh
*Assistant Examiner* — Brady W Frazier
(74) *Attorney, Agent, or Firm* — Weaver Austin Villeneuve & Sampson LLP (57) ABSTRACT

Techniques for deploying a plurality of smallsats from a common launch vehicle are disclosed where a structural arrangement provides a load path between an upper stage of the launch and the plurality of spacecraft. Each spacecraft is mechanically coupled with the launch vehicle upper stage only by the structural arrangement. The structural arrangement includes at least one trunk member that is approximately aligned with the longitudinal axis of the launch vehicle upper stage, a plurality of branch members, each branch member being attached to the trunk member and having at least a first end portion that is substantially outboard from the longitudinal axis; and a plurality of mechanical linkages, each linkage coupled at a first end with a first respective spacecraft and coupled at a second end with one of the plurality of branch members, the trunk member or a second respective spacecraft.

15 Claims, 6 Drawing Sheets

(56) References Cited

U.S. PATENT DOCUMENTS

| | | | | |
|---|---|---|---|---|
| 6,279,482 B1* | 8/2001 | Smith | ...................... | F42B 12/60 |
| | | | | 102/357 |
| 6,296,206 B1* | 10/2001 | Chamness | ................. | B64G 1/00 |
| | | | | 244/173.3 |
| 7,114,682 B1 | 10/2006 | Kistler et al. | | |
| 7,578,482 B2* | 8/2009 | Duden | ................... | B64G 1/002 |
| | | | | 244/171.7 |
| 9,242,743 B2* | 1/2016 | Chu | ....................... | B64G 1/002 |
| 9,434,485 B1* | 9/2016 | Lehocki | ................... | B64G 1/22 |
| 9,463,882 B1* | 10/2016 | Field | ..................... | B64G 1/641 |
| 9,718,566 B2* | 8/2017 | Field | ..................... | B64G 1/641 |
| 9,720,414 B1* | 8/2017 | Theobald | ............... | G06Q 50/14 |
| 9,878,806 B2* | 1/2018 | Helmer | .................. | B64G 1/222 |
| 2002/0000495 A1* | 1/2002 | Diverde | ................ | B64G 1/002 |
| | | | | 244/137.1 |
| 2002/0179776 A1* | 12/2002 | Mueller | ................ | B64G 1/007 |
| | | | | 244/158.5 |
| 2005/0230557 A1* | 10/2005 | Aghili | ..................... | B64G 7/00 |
| | | | | 244/158.1 |
| 2012/0080563 A1* | 4/2012 | Gryniewski | ............ | B25J 11/00 |
| | | | | 244/172.5 |
| 2013/0011189 A1* | 1/2013 | Kamiya | ............... | F16B 7/0426 |
| | | | | 403/338 |
| 2016/0264264 A1* | 9/2016 | Helmer | .................. | B64G 1/222 |
| 2016/0304222 A1* | 10/2016 | Fernandez | ............ | B64G 1/641 |
| 2016/0368625 A1* | 12/2016 | Field | ..................... | B64G 1/641 |

* cited by examiner

SMALLSAT PAYLOAD CONFIGURATION

TECHNICAL FIELD

This invention relates generally to a launch vehicle payload where the payload includes a large number of very small spacecraft, and more particularly to techniques for structurally supporting the spacecraft during launch and deploying the spacecraft following launch.

BACKGROUND

Conventionally, smallsats such as microsats (10-100 kg mass), nanosats (1-10 kg mass) and picosats (0.1-1 kg mass) are launched only in small quantities on shared launches with larger spacecraft or on relatively small launch vehicles. Satellite operators, however, are now contemplating large constellations of nanosats or picosats, for example, the constellations including as many as thousands or even tens of thousands of spacecraft. The presently disclosed techniques enable tens to thousands of smallsats to be simultaneously carried into space on a single launch vehicle, and subsequently deployed into orbit.

SUMMARY

The presently disclosed techniques relate to a launch vehicle payload system that includes a number of small spacecraft and to techniques for structurally supporting the spacecraft during launch and deploying the spacecraft following launch.

According to some implementations, the system includes a payload including a plurality of spacecraft and a structural arrangement providing a load path between a launch vehicle upper stage and the plurality of spacecraft. Each spacecraft is mechanically coupled with the launch vehicle upper stage only by the structural arrangement. The structural arrangement includes: at least one trunk member that is approximately aligned with a longitudinal axis of the launch vehicle upper stage and a plurality of branch members, each branch member being attached to the trunk member and having at least a first end portion that is substantially outboard from the longitudinal axis, and a plurality of mechanical linkages, each linkage coupled at a first end with a first respective spacecraft and coupled at a second end with one of the plurality of branch members, the trunk member or a second respective spacecraft.

In some examples, at least one of the plurality of mechanical linkages may include a first respective end coupled to the first respective spacecraft and a second respective end attached to the second respective spacecraft.

In some examples, at least one spacecraft of the plurality of spacecraft is attached to a respective subset of the plurality of mechanical linkages; and no mechanical linkage in the respective subset is attached to the trunk member.

In some examples, each of the mechanical linkages may include a spring-like coupling that provides substantial resistance to both compression and tension.

In some examples, one or more branch members may have a second end portion attached to the trunk member.

In some examples, one or more branch members may be attached to the trunk at a central portion and may have a second end portion that is substantially outboard from the longitudinal axis.

In some examples, the system may include at least one robotic manipulator. In some examples, the at least one robotic manipulator may be configured to detach at least one of the plurality of spacecraft from the structural arrangement, and deploy the spacecraft by imparting a delta V to the spacecraft. In some examples, the system may include a sensor and the at least one robotic manipulator may be configured to position the at least one spacecraft proximate to the sensor such that a physical inspection may be performed using the sensor. In some examples, the system may include a debris management arrangement and the robotic manipulator may be configured to detach one or more of the mechanical linkages and secure the detached mechanical linkages to the debris management arrangement.

According to some implementations, a method includes deploying, from an orbiting system including a plurality of spacecraft, a first spacecraft of the plurality of spacecraft and deploying, from the orbiting system, a second spacecraft of the plurality of spacecraft. A structural arrangement provides a load path between a launch vehicle upper stage and the plurality of spacecraft. Each spacecraft is mechanically coupled with the launch vehicle upper stage only by the structural arrangement. The structural arrangement includes at least one trunk member that is approximately aligned with a longitudinal axis of the launch vehicle upper stage, a plurality of branch members, each branch member being attached to the trunk member and having at least a first end portion that is substantially outboard from the longitudinal axis, and a plurality of mechanical linkages, each linkage coupled at a first end with a first respective spacecraft and coupled at a second end with one of the plurality of branch members, the trunk member or a second respective spacecraft.

In some examples, the orbiting system may include a robotic manipulator and deploying one or both of the first spacecraft and the second spacecraft may include selecting a set of the plurality of mechanical linkages, each mechanical linkage in the set being coupled at a first respective end with the first spacecraft and at a second respective end with a branch member, the trunk member or a second spacecraft, detaching, with the robotic manipulator, each second respective end, grasping the first spacecraft, imparting a motion to the first spacecraft relative to the orbiting system and releasing the first spacecraft. In some examples, the orbiting system may include a sensor and the method may include, prior to releasing the first spacecraft, performing a physical inspection of the first spacecraft with the sensor. In some examples, the method may further include, prior to releasing the first spacecraft, detaching with the robotic manipulator each first respective end. In some examples, the orbiting system may include a debris management arrangement and the method may further include securing, with the robotic manipulator, each mechanical linkage in the set to the debris management arrangement.

In some examples, at least one of the plurality of mechanical linkages may include a first respective end coupled to the first respective spacecraft and a second respective end attached to the second respective spacecraft.

In some examples, at least one spacecraft of the plurality of spacecraft may be attached to a respective subset of the plurality of mechanical linkages and no mechanical linkage in the respective subset is attached to the trunk member.

In some examples, each of the mechanical linkages may include a spring-like coupling that provides substantial resistance to both compression and tension.

In some examples, one or more branch members may have a second end portion attached to the trunk member.

In some examples, one or more branch members may be attached to the trunk at a central portion and may have a second end portion that is substantially outboard from the longitudinal axis.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

Figure 1:
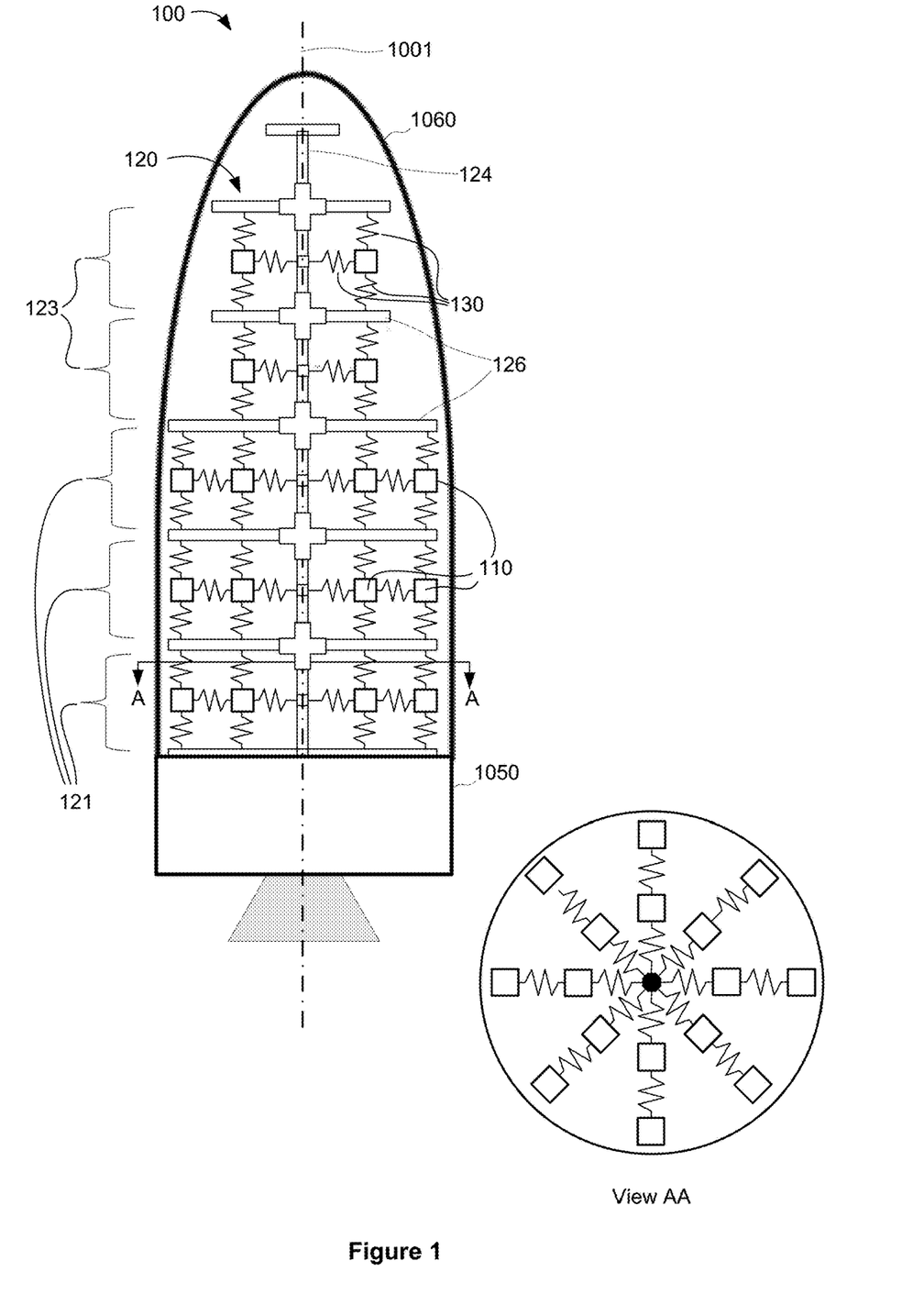
FIG. 1 illustrates a system including a plurality of small spacecraft and a structural arrangement, according to an implementation.

A single large launch vehicle may have a payload capability of several tons. The present disclosure relates to taking advantage of such payload capability to simultaneously launch a large number of smallsats. Referring now to FIG. 1, a system 100 includes a plurality of small spacecraft 110 and a structural arrangement 120. The structural arrangement 120 is, advantageously, configured to provide the only load path between the plurality of spacecraft 110 and a launch vehicle upper stage 1050. The structural arrangement 120 may be configured as a lightweight tree-like structure that includes at least one member 124 approximately aligned with the launch vehicle longitudinal axis 1001 (that may be referred to herein as a "trunk member") and a plurality of "branch" members 126. Each branch member 126 has an end portion that is substantially outboard from the longitudinal axis 1001. In the illustrated implementation, each branch member 126 is approximately orthogonal to the trunk member 124, but other arrangements are contemplated wherein the branch member 126 may be disposed at an acute angle to the longitudinal axis 1001.

The system 100 may include a number of mechanical linkages 130. The structural arrangement 120 may be configured to include interfaces with which the mechanical linkages 130 may be coupled. Each mechanical linkage 130 may be a spring-like coupling that provides substantial resistance to both compression and tension. In the illustrated implementation, each mechanical linkage 130 is detachably coupled at a first end with a first respective spacecraft 110 and is detachably coupled at a second end with either of: one of the plurality of branch members 126, the at least one trunk member 124, or a second respective spacecraft 110.

In an implementation, the structural arrangement 120 conforms to the cylindrical/conical inner surface a launch vehicle fairing 1060 so as to efficiently utilize the interior volume of the launch vehicle fairing. The mechanical linkages 130 between the spacecraft 110 may be structurally modeled as mechanical springs configured to resist both compressive and tensile forces. A spring constant of the mechanical linkages 130 may be selected such that the system (structural arrangement 120, mechanical linkages 130 and spacecraft 110) exhibits a requisite degree of stiffness. In addition to supporting the small spacecraft 110, the mechanical linkages 130 may also prevent physical contact between individual spacecraft 110 in the face of launch vibration and acoustic loads, thus preventing damage to the spacecraft 110.

In the configuration illustrated in FIG. 1, 64 small spacecraft 110 are contemplated (16 spacecraft 110 disposed in each of three lower tiers 121, and 8 spacecraft 110 disposed in each of two upper tiers 123). The illustrated 3D lattice-like arrangement of spacecraft may be considerably more extensive than illustrated. As a result, a much greater number of very small spacecraft, for example one thousand or more nanosats, may be accommodated by the illustrated techniques.

Advantageously, mechanical couplings between the supporting structure 120 and the launch vehicle fairing 1060 are avoided, in order to simplify separation of the launch vehicle fairing 1060 during or after ascent to orbit. Instead, the spacecraft 110 are mechanically coupled, by way of the branch members 126 and the trunk member 124 to the launch vehicle upper stage 1050. In the illustrated implementation, the trunk member 124 extends vertically along the launch vehicle longitudinal axis 1001. The trunk member 124 may be the primary load-path between the lattice arrangement and the launch vehicle upper stage 1050. The system 100 may be assembled prior to launch from its individual components. For example, a desired number of branch members 126 may first be attached to the trunk member 124, forming a tree-like structural arrangement 120. Subsequently, the small spacecraft 110 may then be attached to the structural arrangement 120, using the mechanical linkages 130. Each small spacecraft 110 may be supported, by way of detachable couplings with the mechanical linkages 130 to form the illustrated three-dimensional lattice-like structure.

In addition to those mechanical linkages 130 that couple a spacecraft 110 with the trunk member 124 or with a branch member 126, some mechanical linkages 130 may couple one spacecraft 110 with a neighboring spacecraft 110, as may be better observed in View A-A.

The spacecraft 110 may be detached from the structural arrangement 120 following ascent to orbit. In an embodiment, illustrated in FIG. 2, the system 100 includes one or more robotic arms 250 configured to detach the spacecraft 110 from the structural arrangement 120. In other implementations, a robotic arm mounted on a free-flying spacecraft (not illustrated) that may be carried to orbit by the same launch vehicle as the many small spacecraft. This servicing craft could also be carried to orbit by a separate launch vehicle. In such a case, the servicing craft may be configured to perform orbital rendezvous and then dock with the launch vehicle carrying the small spacecraft.

Figure 3:
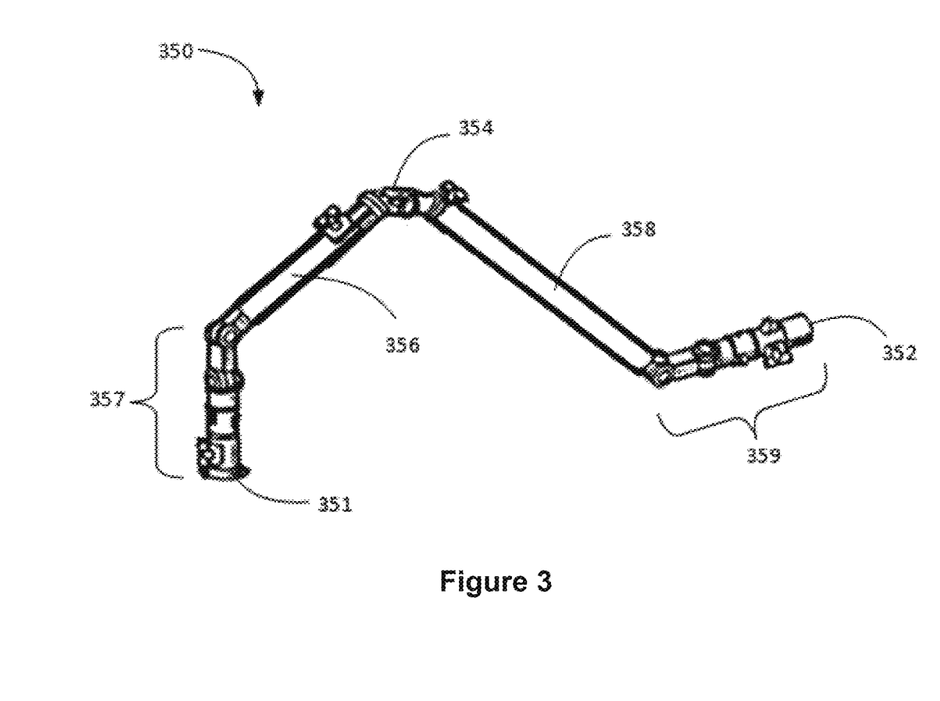
FIG. 3 illustrates an example of a robotic manipulator, according to an implementation.

In some implementations, the robotic manipulator 250 may include a robotic arm having two end effectors and a number of articulable joints disposed therebetween. For example, referring now to FIG. 3, an example of a robotic manipulator will be described. Manipulator 350 includes first and second longitudinally elongated arms 356 and 358. Respective proximal ends of the arms 356 and 358 may be coupled together by means of an elbow joint 354. Articulator 357 including one or more articulable joints may be coupled with a distal end of arm 356. Similarly, articulator 359 may be coupled with a distal end of arm 358. In some implementations one or both of the articulator 357 and the articulator 359 includes a pitch joint, a yaw joint, and a roll joint. First and second end effectors 351 and 352 may be mounted at the respective distal ends of the articulators 357 and 359.

Figure 2:
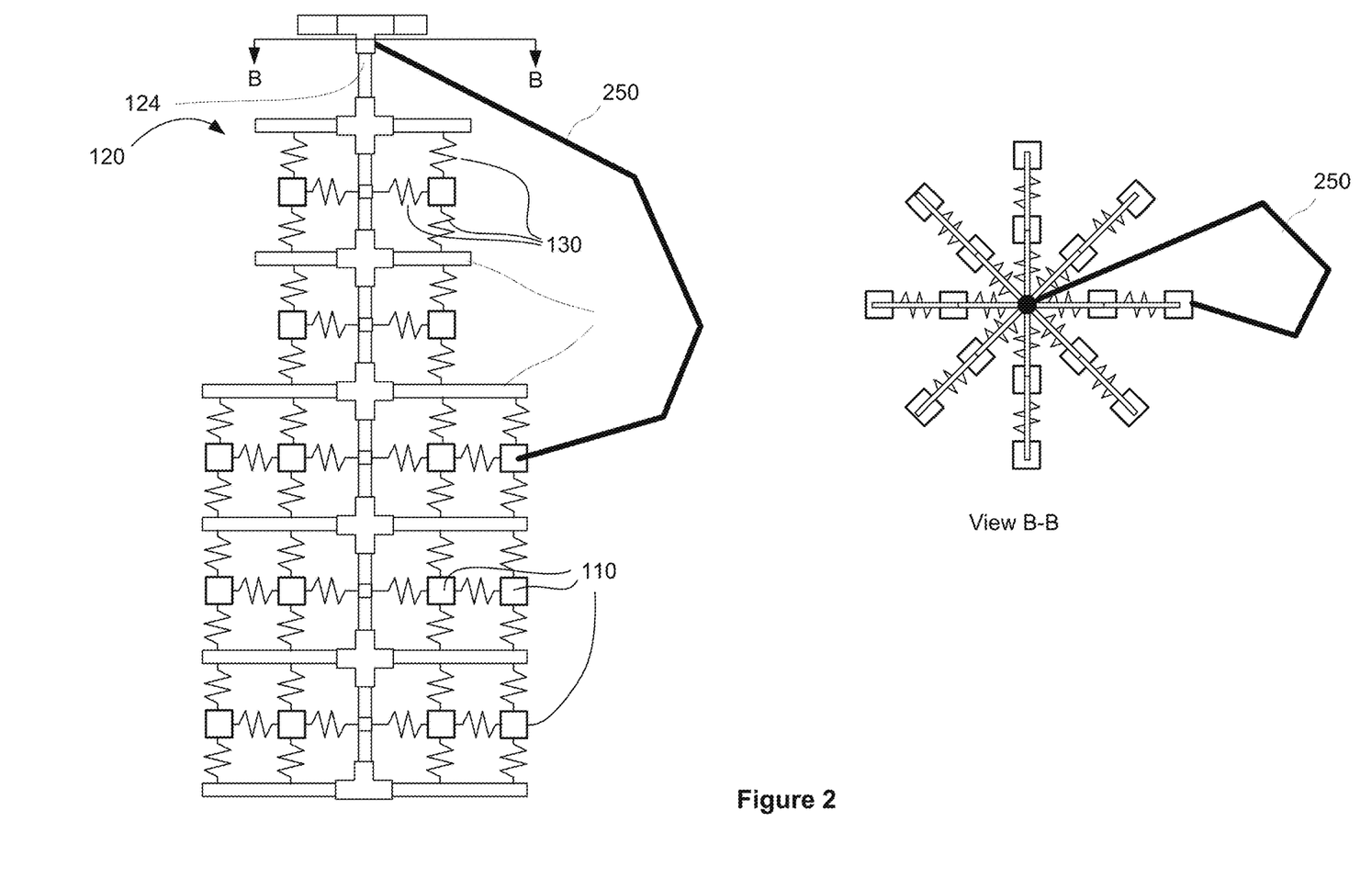
FIG. 2 illustrates a system including a plurality of small spacecraft, a structural arrangement and a robotic manipulator, according to an implementation.

The mass of the robotic manipulator(s) 250 used to disassemble the lattice may be expected to be a small fraction of the aggregate total mass of the multiple spacecraft 110. The robotic manipulator 250 may be configured to detach mechanical linkages 130. The robotic manipulator 250 may move each small spacecraft 110, one by one, for example, a safe distance from the remaining spacecraft and provide the spacecraft 110 with a modest delta-V to assure positive separation. The robotic manipulator 250 may also be used to facilitate inspection of any or all of the small spacecraft 110 prior to separation. For example, the robotic manipulator 250 may be configured to position a selected small spacecraft 110 in view of a camera or various other sensors. The robotic manipulator 250 may be used to secure the detached mechanical linkages to or within a debris management arrangement such as a storage bin or bins (not illustrated) to avoid creation of orbital debris.

Figure 4:
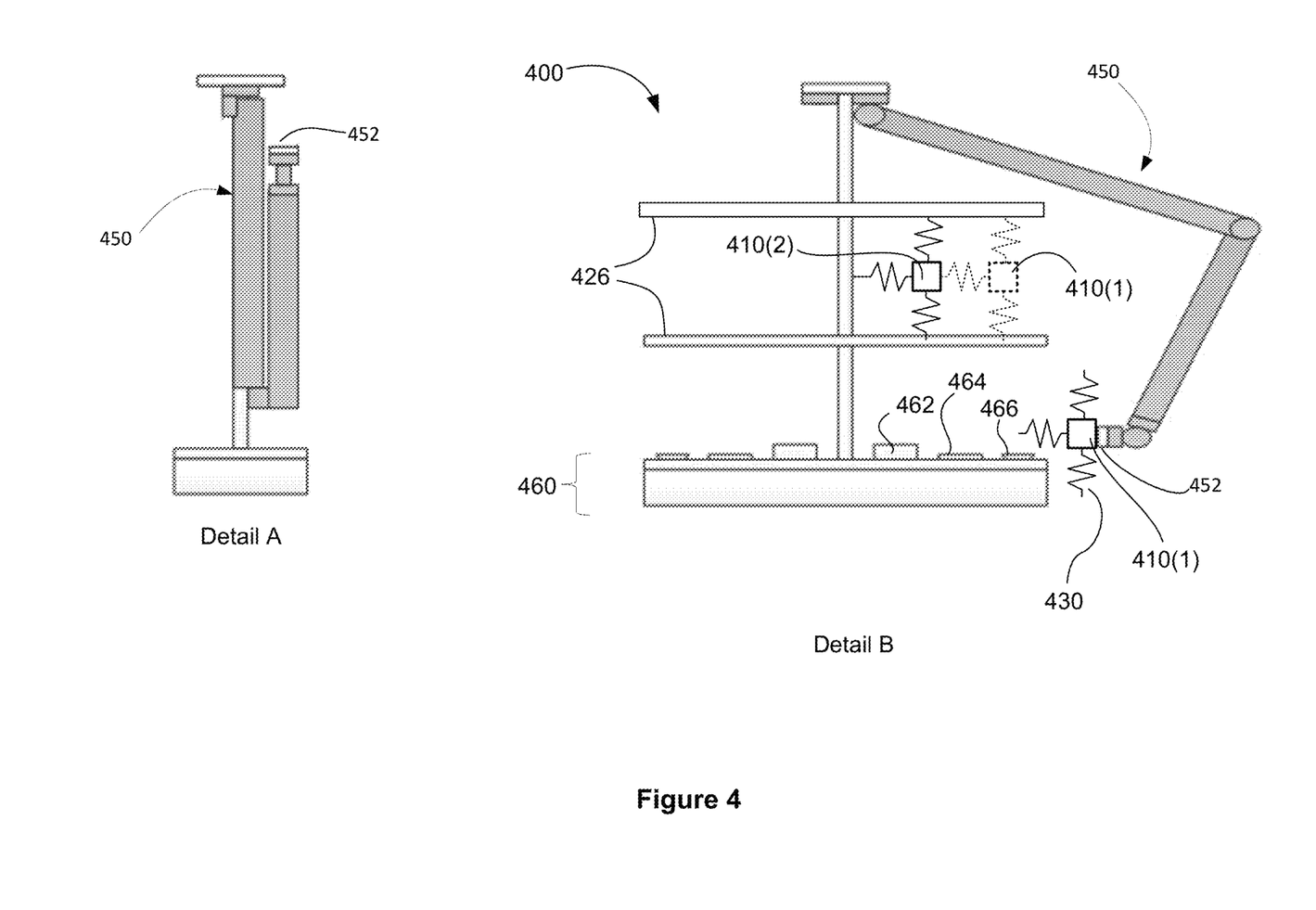
FIG. 4 illustrates a conceptual view of a system that includes a robotic manipulator configured for use in a deployment process.

FIG. 4 illustrates a conceptual view of a system 400 that includes a robotic manipulator 450 configured for use in a deployment process. In Detail A, the robotic manipulator 450 is illustrated as being in a stowed configuration; in Detail B, the robotic manipulator 450 is illustrated as being in a deployed configuration. In the illustrated implementation, a single robotic manipulator 450 is illustrated, but it will be appreciated that two or more robotic manipulators 450 may be contemplated in order to provide a desired degree of redundancy.

In some implementations, one or all of the robotic manipulators 450 may have a range of motion which covers the entire interior of the launch vehicle fairing. Whether or not the robotic manipulator 450 has such a range of motion, the robotic manipulator 450 may be configured as a self-relocatable manipulator, such as described, for example, in U.S. Pat. No. 4,585,388, the disclosure of which is hereby incorporated by reference into the present application in its entirety.

In some implementations, the robotic manipulator 450 may include a first end effector 452, configured to facilitate the detachment, inspection and deployment of each individual spacecraft. For example the first end effector 452 may be configured to interface with a small spacecraft 410 and/or a mechanical linkage 430. In some implementations, the robotic manipulator 450 may sequentially grasp, with the first end effector 452, each small spacecraft 410 one at a time. As illustrated in Detail B, the robotic manipulator 450 may be configured to detach the mechanical linkages 430 coupling a spacecraft 410 (1) from the supporting branches 426 and an adjacent spacecraft 410(2) before grasping the spacecraft 410 and moving it away from a first position (dashed line) to a second position (solid line).

In some implementations the second position may be a location from which the spacecraft 410(1) is to be separated (deployed) from the system 400. In the illustrated implementation, however, the system 400 is configured to perform one or more of the following additional processes before the spacecraft 110(1) is deployed. More particularly, the system 400 includes a module 460 for inspection, testing and/or servicing of the spacecraft 110. In the illustrated implementation the module 460 includes a debris management arrangement 462, a second end effector 464, and an inspection station 466. The second position, accordingly, may be proximate to the inspection station 466 which may include a sensor (e.g., a camera or other imager) for physical inspection of the spacecraft 410(1). The second position may also be proximate to the second end effector 464. Subsequent and/or prior to physical inspection of the spacecraft 410(1), the robotic manipulator 450 may be configured to place the spacecraft 410(1) so as to engage the second end effector 464. The second end effector 464 may be configured to grasp the spacecraft 410(1), following which the robotic manipulator 450 may disengage from the spacecraft 410(1) and proceed with other tasks while the spacecraft is held in place by the second end effector 464. For example, the robotic manipulator 450 may grasp and detach individual mechanical linkages 430 from the spacecraft 410(1), and secure the detached mechanical linkages 430 to the debris management arrangement 462. In some implementations the debris management arrangement may be a storage bin and securing the detached mechanical linkages 430 to the debris management arrangement 462 may include placing the detached mechanical linkages 130 inside the storage bin. As a result, creation of orbital debris may be avoided. The storage bin 462 may also be used to dispose of spacecraft which have failed the physical inspection procedure. The module 460 may further include interfaces by which checkout and pre-deployment procedures for the spacecraft 410 may be accomplished, including, for example, mechanical or electrical subsystem checkouts.

Upon completion of the foregoing processes, the robotic manipulator 450 may reengage the spacecraft 410 which may then be released from the second end effector 464. The robotic manipulator 450 may then proceed to deploy the spacecraft 410 through a combination of an axial movement and release, similar to a "throwing mechanism". The release may be timed such that the arm will provide the desired delta-V to the spacecraft 410. Upon completion of the deployment task, the robotic manipulator 450 may move on to the next spacecraft in sequence.

In some implementations, the structural arrangement 420 may include propulsion capability and/or remain attached to a launch vehicle upper stage that has propulsion capability. In such implementations, the structural arrangement, following deployment of the smallsats, may be deorbited by the onboard propulsion capability.

Figure 5:
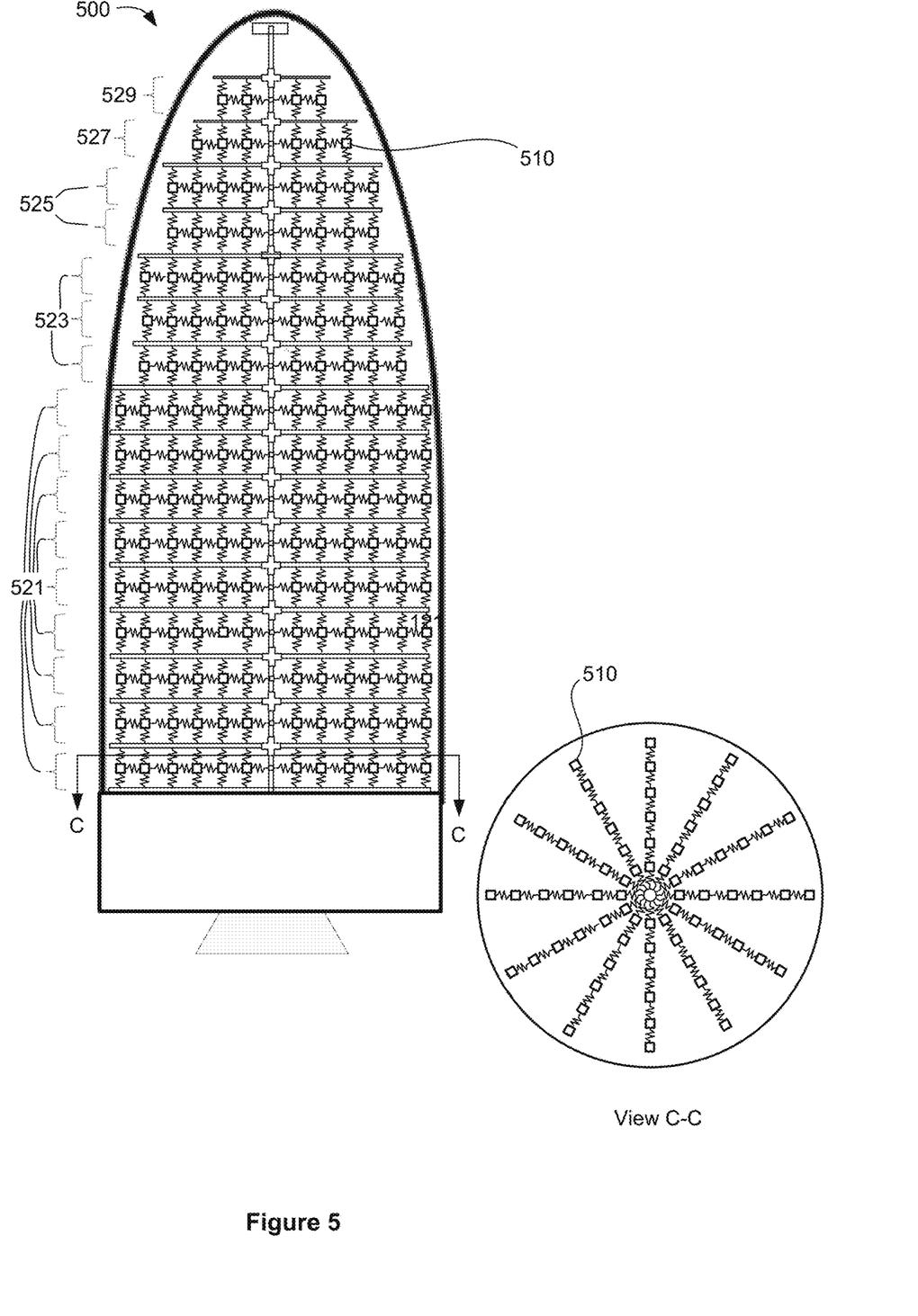
FIG. 5 illustrates a system including a plurality of small spacecraft and a structural arrangement, according to another implementation.

As indicated above in connection with FIG. 1, the presently disclosed techniques contemplate a launch vehicle payload that includes a large number of relatively small spacecraft disposed in an arrangement that efficiently uses available launch vehicle fairing volume. FIG. 5 illustrates an example implementation that includes 16 tiers, each tier including a number of smallsats 510. More particularly, in the illustrated implementation, nine lower tiers 521 each include 72 smallsats 510, three intermediate tiers 523 each include 60 smallsats 510; two intermediate tiers 525 each include 48 smallsats 510; one intermediate tier 527 includes 36 smallsats 510; and one upper tier 529 includes 24 small sets 510. Thus, in the illustrated implementation, as many as 984 smallsats 510 may be accommodated.

Figure 6:
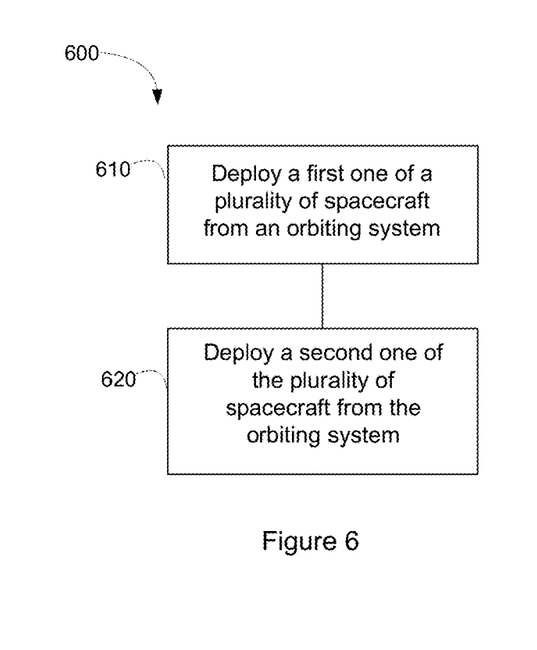
FIG. 6 illustrates a process flow diagram for deploying a spacecraft from an orbiting system.

FIG. 6 illustrates a process flow diagram for deploying a plurality of spacecraft from an orbiting system. The method 600 may start, at block 610, by deploying a first one of the plurality of spacecraft from the orbiting system. The method may continue, at block 620, by deploying a second one of the plurality of spacecraft. As described hereinabove, the orbiting system may include the plurality and a structural arrangement providing a load path between a launch vehicle upper stage and the plurality of spacecraft. Each spacecraft may be mechanically coupled with the launch vehicle upper stage only by the structural arrangement. The structural arrangement may include at least one trunk member that is approximately aligned with the longitudinal axis of the launch vehicle upper stage, a plurality of branch members, each branch member being attached to the trunk member and having at least a first end portion that is substantially outboard from the longitudinal axis, and a plurality of mechanical linkages, each linkage coupled at a first end with a first respective spacecraft and coupled at a second end with one of the plurality of branch members, the trunk member or a second respective spacecraft.

Figure 7:
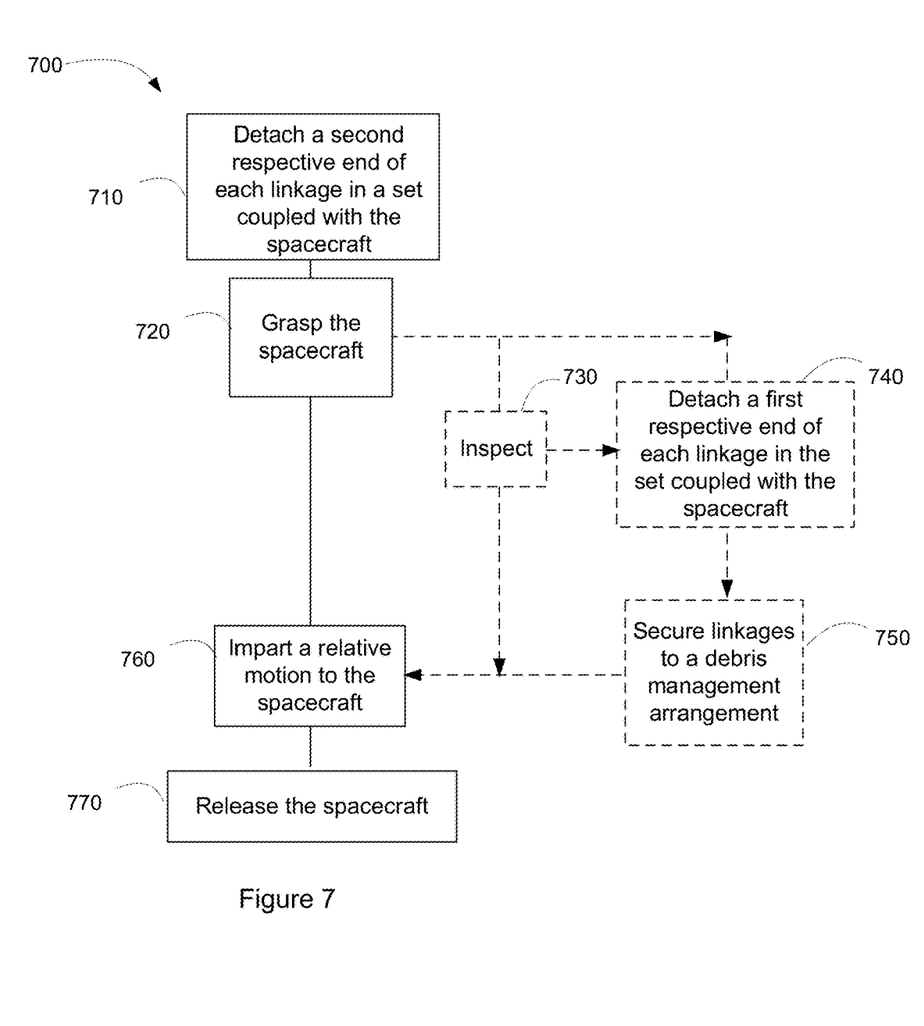
FIG. 7 illustrates a process flow diagram for deploying a plurality of spacecraft from an orbiting system.

FIG. 7 illustrates a process flow diagram for deploying the spacecraft from the orbiting system, according to some implementations. The method 700 may be executed as part of one or both of block 610 and block 620 of the method 600 where the orbiting system includes a robotic manipulator as described above. The method 700 may start, at block 710, with detaching, using the robotic manipulator, each respective second end of the mechanical linkages coupled with the spacecraft. The method 700 may continue, at block 720 with grasping the spacecraft with the robotic manipulator.

As described hereinabove the robotic manipulator may be configured to deploy the spacecraft by imparting a delta V to the spacecraft relative to the orbiting system. Accordingly, the method 700 may continue at block 760 imparting a relative motion to the spacecraft and, at block 770, releasing the spacecraft.

Optionally, in some implementations one or more of additional process block 730, 740 and 750 may be executed prior to block 760. In some limitations, for example, the orbiting system includes a sensor, and block 730 may be executed, so as to perform a physical inspection of the spacecraft using the sensor.

Whether or not optional block 730 is executed, in some implementations the robotic manipulator may optionally be used to detach each respective first end of the mechanical linkages coupled with the spacecraft. Moreover, in some implementations the orbiting system includes a debris management arrangement, and the method 700 optionally includes executing block 750 so as to secure detached linkages to the debris management arrangement.

Should be noted that, although the above described methods have related to the deployment single spacecraft, one spacecraft at a time. Present disclosure contemplates that, in some implementations, two or more smallsats may be deployed simultaneously. In some implementations the two or more small sets may be coupled together with mechanical linkages at the time of deployment. In some implementations the two or more small sets may share a common propulsion system.

Thus, techniques for enabling tens to thousands of smallsats to be simultaneously carried into space on a single launch vehicle, and subsequently deployed into orbit, have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A system comprising:
a payload including a plurality of spacecraft; and
a tree-like structural arrangement providing a load path between a launch vehicle upper stage and the plurality of spacecraft; wherein
each spacecraft is mechanically coupled with the launch vehicle upper stage only by the structural arrangement; and
the tree-like structural arrangement includes:
at least one trunk member that is approximately aligned with a longitudinal axis of the launch vehicle upper stage;
a plurality of branch members, each branch member having at least a first end portion that is substantially outboard from the longitudinal axis and a second end portion attached to the trunk member; and
a plurality of mechanical linkages, each mechanical linkage having a first respective end and a second respective end, wherein:
the first respective end of each linkage is detachably coupled with a first respective spacecraft;
the second respective end of at least one of the mechanical linkages is attached to one of the plurality of branch members, the trunk member or a second respective spacecraft;
each of the mechanical linkages includes a spring-like coupling that provides resistance to both compression and tension; and
at least one of the plurality of mechanical linkages includes a first respective end coupled to the first respective spacecraft and a second respective end attached to the second respective spacecraft.

2. The system of claim 1, wherein:
at least one spacecraft of the plurality of spacecraft is coupled with a respective subset of the plurality of mechanical linkages; and
the second respective end of each mechanical linkage in the respective subset is attached to another of the plurality of spacecraft or to one of the plurality of branch members.

3. The system of claim 1, wherein one or more branch members are attached to the trunk at a central portion and have a second end portion that is substantially outboard from the longitudinal axis.

4. The system of claim 1, further comprising at least one robotic manipulator.

5. The system of claim 4 wherein the at least one robotic manipulator is configured to detach at least one of the plurality of spacecraft from the structural arrangement, and deploy the spacecraft by imparting a delta V to the spacecraft.

6. The system of claim 5 wherein the system includes a sensor and the at least one robotic manipulator is configured to position the at least one spacecraft proximate to the sensor such that a physical inspection may be performed using the sensor.

7. The system of claim 5, wherein the system includes a debris management arrangement and the robotic manipulator is configured to detach one or more of the mechanical linkages and secure the detached mechanical linkages to the debris management arrangement.

8. A method comprising:
deploying, from an orbiting system including a plurality of spacecraft, a first spacecraft of the plurality of spacecraft; and
deploying, from the orbiting system, a second spacecraft of the plurality of spacecraft; wherein
tree-like structural arrangement provides a load path between a launch vehicle upper stage and the plurality of spacecraft;
each spacecraft is mechanically coupled with the launch vehicle upper stage only by the structural arrangement; and
the tree-like structural arrangement includes at least one trunk member that is approximately aligned with a longitudinal axis of the launch vehicle upper stage, a plurality of branch members, each branch member having at least a first end portion that is substantially outboard from the longitudinal axis and a second end portion attached to the trunk member, and a plurality of mechanical linkages, each mechanical linkage having a first respective end and a second respective end, wherein:
each of the mechanical linkages includes a spring-like coupling that provides substantial resistance to both compression and tension;
the first respective end of each linkage is detachably coupled with a first respective spacecraft;
the second respective end of at least one of the mechanical linkages is attached to one of the plurality of branch members, the trunk member or a second respective spacecraft; and
at least one of the plurality of mechanical linkages includes a first respective end coupled to the first respective spacecraft and a second respective end attached to the second respective spacecraft.

9. The method of claim 8, wherein the orbiting system includes a robotic manipulator and deploying one or both of the first spacecraft and the second spacecraft includes:
selecting a set of the plurality of mechanical linkages, each mechanical linkage in the set being coupled at a first respective end with the first spacecraft and at a second respective end with a branch member, the trunk member or a second spacecraft;
detaching, with the robotic manipulator, each second respective end;
grasping the first spacecraft;
imparting a motion to the first spacecraft relative to the orbiting system; and
releasing the first spacecraft.

10. The method of claim 9, wherein the orbiting system includes a sensor and further including, prior to releasing the first spacecraft, performing a physical inspection of the first spacecraft with the sensor.

11. The method of claim 9, further including, prior to releasing the first spacecraft, detaching with the robotic manipulator each first respective end.

12. The method of claim 11, wherein the orbiting system includes a debris management arrangement and further including securing, with the robotic manipulator, each mechanical linkage in the set to the debris management arrangement.

13. The method of claim 8, wherein at least one of the plurality of mechanical linkages includes a first respective end coupled to the first respective spacecraft and a second respective end attached to the second respective spacecraft.

14. The method of claim 8, wherein:
at least one spacecraft of the plurality of spacecraft is coupled with a respective subset of the plurality of mechanical linkages; and
the second respective end of each mechanical linkage in the respective subset is attached to another of the plurality of spacecraft or to one of the plurality of branch members.

15. The method of claim 8, wherein one or more branch members are attached to the trunk at a central portion and have a second end portion that is substantially outboard from the longitudinal axis.

\* \* \* \* \*